US008333870B2

(12) United States Patent
Burchard et al.

(10) Patent No.: US 8,333,870 B2
(45) Date of Patent: Dec. 18, 2012

(54) SECURITY PAPER

(75) Inventors: Theo Burchard, Tegernsee (DE); Mario Keller, Bad Endorf (DE); Reinhard Tauber, Miesbach (DE); Rudolf Seidler, Tegernsee (DE)

(73) Assignee: Giesecke & Devrient GmbH, Munich (DE)

( * ) Notice: Subject to any disclaimer, the term of this patent is extended or adjusted under 35 U.S.C. 154(b) by 724 days.

(21) Appl. No.: 10/528,392

(22) PCT Filed: Sep. 18, 2003

(86) PCT No.: PCT/EP03/10427
§ 371 (c)(1),
(2), (4) Date: Nov. 14, 2005

(87) PCT Pub. No.: WO2004/028825
PCT Pub. Date: Apr. 8, 2004

(65) Prior Publication Data
US 2006/0127649 A1 Jun. 15, 2006

(30) Foreign Application Priority Data

Sep. 19, 2002 (DE) .............................. 102 43 653 U (51) Int. Cl.
*B32B 27/10* (2006.01)
*D21H 27/00* (2006.01)
*B42D 15/10* (2006.01)

(52) U.S. Cl. ............ 162/140; 162/110; 283/57; 283/58; 283/59; 283/72; 283/107; 283/113; 428/474.4; 428/481; 428/507; 428/511

(58) Field of Classification Search .................. 428/481, 428/507, 511, 474.4, 479.6; 156/324; 162/140, 162/134–136, 110; 283/57–59, 72, 107, 283/113
See application file for complete search history.

(56) References Cited

U.S. PATENT DOCUMENTS

| | | | | |
|---|---|---|---|---|
| 3,489,643 A * | 1/1970 | Hoffman | ...................... | 162/146 |
| 4,389,472 A * | 6/1983 | Neuhaus et al. | ................. | 430/10 |
| 4,455,359 A * | 6/1984 | Patzold et al. | ................... | 430/10 |
| 4,462,866 A * | 7/1984 | Tooth et al. | .................... | 162/103 |
| 4,506,915 A * | 3/1985 | Haghiri-Tehrani et al. | ..... | 283/75 |
| 4,830,928 A * | 5/1989 | Tamagawa et al. | ........... | 428/511 |
| 4,850,061 A * | 7/1989 | Engel | .............................. | 4/245.4 |
| 5,261,954 A * | 11/1993 | Collings | ..................... | 106/31.17 |
| 5,449,200 A | 9/1995 | Andric et al. | | |
| 5,567,276 A * | 10/1996 | Boehm et al. | ................. | 162/103 |
| 5,686,180 A * | 11/1997 | Rivlin et al. | ................... | 428/350 |
| 5,868,902 A * | 2/1999 | Howland et al. | .............. | 162/140 |
| 5,961,432 A * | 10/1999 | Murakami et al. | ............ | 493/187 |
| 6,135,503 A * | 10/2000 | Lob et al. | ..................... | 283/63.1 |
| 6,428,051 B1 * | 8/2002 | Herrmann et al. | ............. | 283/107 |
| 2002/0022112 A1 * | 2/2002 | Hoeppner et al. | ............. | 428/156 |
| 2003/0059636 A1 * | 3/2003 | Nigam | ........................ | 428/479.6 |
| 2004/0239097 A1 * | 12/2004 | Boehm et al. | ................... | 283/57 |

FOREIGN PATENT DOCUMENTS

| | | |
|---|---|---|
| AU | 488652 | 4/1976 |
| DE | 1421398 | 1/1976 |
| EP | 0290875 A1 | 11/1988 |
| EP | 0490825 A1 | 6/1992 |
| EP | 1 152 369 A1 | 11/2001 |
| EP | 1 174 278 A1 | 1/2002 |
| WO | WO 96/28610 A1 | 9/1996 |
| WO | 9813211 A1 | 4/1998 |
| WO | 9815418 A1 | 4/1998 |
| WO | WO 98/14661 A1 | 4/1998 |
| WO | 0076784 A1 | 12/2000 |
| WO | WO 02/02350 A1 | 1/2002 |
| WO | WO 03/029003 A1 | 4/2003 |

OTHER PUBLICATIONS

Haylock, E. W., "Paper: Its making, merchanting and usage" The National Association of Paper Merchants, London, 1974, p. 22.*
Definition of "foil", Websters II New Riverside University Dictionary, Houghton Mifflin Company, 1988, p. 492.*
"Physical Properties Polyurethane Sheet, Bar Stock and Rod,s" product information sheet [online] K-mac Plastics, no date, pp. 1-2 [[retrieved on Sep. 5, 2011], Retrieved from the Internet <URL: http://k-mac-plastics.com/data%20sheets/polyurethane_properties.htm>.*
Polymer Handbook (4th Edition) Edited by: Brandrup et al, 2005 John Wiley & Sons, pp. VI/49-VI/51.*
Camus et al. "Security Papers and Special Effects" R. L. van Renesse (Editor), publisher, Artech House, Inc., Optical Document Security, Chapter 5, pp. 95-110, Contents vii-xv (1994).
Nusmeier, H. W. et al, "Optical Security in Laminates" R.L. van Rnesse (Editor), publisher, Artech House, Inc., Optical Document Security, Chapter 16, pp. 317-334, Contents vii-xv (1994).

* cited by examiner

*Primary Examiner* — Matthew Daniels
*Assistant Examiner* — Dennis Cordray
(74) *Attorney, Agent, or Firm* — Rothwell, Figg, Ernst & Manbeck, P.C.

(57) ABSTRACT

The invention relates to a security paper for producing value documents, such as bank notes or the like, which includes a creasable, multilayer substrate having at least one paper layer and at least one film, and to a method for producing such a security paper.

23 Claims, 5 Drawing Sheets

SECURITY PAPER

CROSS-REFERENCE TO RELATED APPLICATION

This application is a National Phase of International Application Serial No. PCT/EP03/10427, filed Sep. 18, 2003.

FIELD OF THE INVENTION

This invention relates a security paper for producing value documents, such as bank notes or the like, which comprises a creasable, multilayer substrate comprising at least one paper layer and at least one film, and to a method for producing such a security paper.

DESCRIPTION OF THE BACKGROUND ART

Value documents according to the invention are bank notes, check forms, shares, certificates, postage stamps, air tickets, labels for product protection and the like. The simplifying designation "security paper" or "value document" will hereinafter therefore always include documents of the stated type.

Bank notes are normally manufactured from so-called security papers consisting of cotton fibers and having special security features, such as a security thread at least partly incorporated into the paper, and a watermark. The period of circulation of a bank note depends on how much it is stressed. Certain denominations are preferably used in trade and thus have a shorter period of circulation due to the stronger load through environmental influences. The main cause for a restricted period of circulation of bank notes is seen to be early soiling. Since bank note paper is very porous, it has a large surface area or high surface roughness. Even if the resulting projections and cavities are in orders of magnitude that cannot be resolved by the human eye, they offer ideal conditions for dirt deposits in comparison with a smooth surface.

It has therefore been suggested in WO 98/15418 to manufacture bank notes completely from a plastic substrate. However, in this case the usual and time-tested security elements such as portrait watermark and windowed security thread must be forgone, as well as the special properties such as sound and feel of bank note paper. Also, the steel gravure printing usual in the bank note sector, which serves as an additional tactile authenticity mark due to the relief arising from the inking, leads only to a flat, hardly noticeable relief on plastic substrates. Moreover, pure plastic bank notes are very sensitive to heat, so that plastic substrates have a strong tendency to shrink particularly in countries with unfavorable climatic conditions. In particular with regard to falsification security, plastic bank notes have the decisive disadvantage that the substrate is readily available and can be procured by anyone.

WO 96/28610 has suggested lacquering, i.e. coating, paper bank notes as an alternative. This does reduce the soiling problem but cannot increase the mechanical stability of a substrate.

Multilayer substrates comprising a film core coated on both sides with paper plies have also been proposed. The strength of this laminate is increased in comparison with a pure paper substrate, but the soiling problem with the exterior paper layers is not solved. So as not to excessively increase the total thickness of such bank notes, the paper plies must moreover be designed very thin, so that the usual security features such as security thread or watermark can no longer be optimally incorporated.

SUMMARY OF THE INVENTION

The problem of the invention is therefore to produce a security paper that is dirt-repellant, has increased mechanical strength and therefore a high period of circulation, and has increased falsification security.

The solution to this problem results from the disclosure herein.

According to the invention the security paper comprises or consists of a creasable multilayer substrate comprising at least one paper layer and one film, the film being equipped with at least one security feature.

The multilayer substrate is a creasable structure which has the bending and folding properties of a sheet and is not rigid and barely flexible like a card. In particular, the substrate is to have the feel and sound of paper as far as possible.

In the simplest case the substrate consists of two layers, namely a paper layer and a film at least partly applied to one side of the paper layer. Neither the paper layer nor the film layer is necessarily formed all over. To maximize the protective properties of the film, the film will preferably cover the paper layer all over. This also applies to other multilayer substrates with more than two layers.

It is preferable to use a layer structure in which a paper layer is covered on both sides with film, preferably all over. That is, the substrate has a paper core whose surfaces are covered with film at least partly, preferably all over.

The type of paper layer need not fulfill any conditions, so that usual papers made of annual fibers, in particular cotton fibers or cellulose fibers, can be used, as well as papers consisting at least partly of synthetic fibers, preferably polyamide fibers.

The paper layer normally has a weight of from 50 to 100 $g/m^2$, preferably from 80 to 90 $g/m^2$. Any suitable weight can of course be used depending on the mode of application.

The paper layer can be of single-ply or multi-ply construction. In case of multi-ply paper layers, the paper layers can consist of the same or different paper types and be in turn combined with plastic films. Hereinafter "paper layer" will refer to both the single-ply and the multi-ply variants.

Furthermore there is the possibility to provide the paper layer all over or as single partial areas. A film can e.g. cover an interrupted paper layer or several separate partial areas of paper.

The paper layer is preferably produced on a cylinder paper machine.

The paper layer can additionally be equipped with security features to impede imitation of the security paper.

The security features can be applied to the paper layer or incorporated within the volume of the paper layer.

If the security features are to be incorporated within the volume of the security paper, the features in question are preferably already incorporated into the paper pulp during papermaking.

As a classic security feature, in particular a watermark is incorporated into the paper layer. Alternatively or additionally, security threads can be incorporated into the paper. A so-called windowed security thread, which appears on the front and/or back of the paper layer, must be regarded as particularly suitable for improving security. It is also conceivable to incorporate the security thread into the laminate in such a way that it comes to lie completely visibly between the paper layer and the film. Said security thread is incorporated for example during production of the laminate and can be fixed on the paper ply by composite adhesive and the film.

A security feature incorporated within the paper volume can be a feature substance with a visually and/or machine detectable physical property. The substance can have for example magnetic, electroconductive, luminescent, light-diffractive, light-polarizing, photochromic, thermochromic or light-interfering properties, and can be uniformly distributed all over or incorporated in the form of patterns. The luminescent feature substances can be for example luminescent substances that are excitable with UV light and emit in the visual spectral range. In the case of a machine check, however, luminescent substances also emitting in the invisible spectral range, preferably the IR spectral range, can be used.

Besides security features incorporated within the volume, security features can also be applied to the paper surface preferably as a print. One side or of course both surfaces of the paper layer can be equipped with security features.

Said security features can firstly be the abovementioned visually and/or machine detectable ones. Secondly, it is particularly suitable to use intaglio printing, which produces on the print substrate during the printing operation a typical relief which is readily palpable. If coated with a very thin film, the relief is palpable in the paper despite the film. Intaglio printing can be done with ink and/or as blind embossing.

Likewise, optically variable security elements can be provided on the paper. Optically variable elements or printing inks that show a viewing angle-dependent interplay of colors due to light diffraction or light interference need a background as smooth as possible for good visibility of this effect, so that when they are applied to paper it must often be pretreated with a primer layer first. Security elements of this kind are for example holograms, Kinegrams® or other diffraction structures, filmlike liquid crystal or interference layer structures, but also printing inks containing interference layer or liquid crystal pigments or other special-effect pigments, such as lustrous metallic effect coloring pigments. Simple metal layers or metallic effect prints are also conceivable.

The security features applied to at least one surface of the paper can also be present in the form of a coding. This is expedient in particular in the case of printed security elements.

By using a plurality of feature substances and/or varying the concentration of one or more feature substances in corresponding printing inks it is very easy to produce any desired codings on the security paper, for example in the form of a bar code. Said coding can constitute for example an independent additional security feature or serve as a comparative feature for other data already provided on the security paper. Thus, information visually visible on the bank note, such as denomination, the name of a person shown in the portrait, or the like, can be encrypted and stored on the paper invisible to the eye in the form of the coding. In a machine check the coding is read, decrypted and checked for identity with the corresponding, visually visible information.

Further, there is the possibility of writing information into the paper by laser. Depending on the intensity of laser energy, different gray, brown and black shades can be produced with which in particular portraits can be represented. Alternatively, microwriting can be done, in which the individual letters have maximum dimensions of 100 μm.

At least partially covering the paper layer with a film prevents open access to the security features applied to or incorporated in the paper layer, so that falsification security is considerably increased.

Either only one surface of the paper layer or both surfaces can be equipped with film. The paper layer is preferably covered completely by the film to obtain optimal surface protection.

The film is a plastic film, preferably of polyethylene terephthalate PET or oriented polypropylene OPP. Any other suitable plastic substrate is of course also usable. Depending on the application, the films can have a matted or glossy finish. A special variant of the matt/gloss effect on a film can be produced e.g. by coating a glossy film in certain areas with a photoresist, then etching the film surface, and subsequently removing the photoresist. The film is still glossy in the area of the originally applied photoresist, while the surface appears slightly etched and therefore dull in the areas without photoresist.

The film has a thickness of preferably 1 to 20 μm, particularly preferably 6 to 15 μm. Depending on the application, films only 6 μm thick can also be used. In this case the typical properties of a paper sheet, such as creasability and foldability, can be particularly effective.

The films serve to improve the mechanical strength of the security paper, among other things. To increase this further, in particular also to improve edge tear ability, the films used can have different stretch. In particular the films applied to different sides of the paper layer considerably increase edge tear resistance when they have different stretch.

Besides the ability to increase mechanical stability and dirt repellence of a security paper, the films can also decisively contribute to improved falsification security if equipped accordingly with security features.

The films can, like the paper layer, be equipped with security features that are applied to the film surface and/or incorporated within the volume of the film.

A security feature incorporated within the film volume can be a feature substance with a visually and/or machine detectable physical property. The substance can have for example magnetic, electroconductive, luminescent, light-diffractive, light-polarizing, photochromic, thermochromic, or light-interfering properties, and can be uniformly distributed all over or incorporated in the form of patterns. The luminescent additives can be for example luminescent substances that are excitable with UV light and emit in the visual spectral range. In the case of a machine check, however, luminescent substances also emitting in the invisible spectral range, preferably the IR spectral range, can be used.

In the case of security features applied to the surface of the film, the security feature can come to lie on the side facing away from the paper and/or the side facing the paper. With a three-layer substrate, the security feature would therefore be present on one surface of the film either on the outer side of the substrate or on the inner side thereof. In particular security features that enter into a less firm bond with the film preferably come to lie on the inner side of the laminate, so that the poor accessibility impedes forgery.

The security features applied to the surface of the film can be the abovementioned visually and/or machine detectable security features.

Likewise, optically variable security elements can be provided on the film. Optically variable elements or printing inks showing a viewing angle-dependent interplay of colors due to light diffraction or light interference need a background as smooth as possible for good visibility of this effect, as particularly films offer. Security elements of this kind are for example holograms, Kinegrams® or other diffraction structures, filmlike liquid crystal or interference layer structures, but also printing inks containing interference layer or liquid crystal pigments or other special-effect pigments, such as lustrous metallic effect coloring pigments. Simple metal layers or metallic effect prints are also conceivable.

The security features applied to the film can also be present in the form of a coding, as already described in detail in connection with the paper layer.

A security feature that can be applied to the surface of the film can also be e.g. a special print.

A particularly suitable special print is an intaglio print, in which a readily palpable relief surface is produced. The print can be done firstly on the fully laminated multilayer substrate, so that the finished laminate can thus be processed and printed like a conventional security paper. Intaglio printing can be done with ink and/or as blind embossing.

Secondly the film can be printed separately before it is incorporated into the laminate, and only be applied to the paper layer after the printing operation.

As explained in connection with the paper layer, information can also be written into the film by laser.

Of the optically variable elements or printing inks, in particular metallizations of the film are suitable, possibly in combination with diffraction structures. The metallization can be of opaque or semitransparent design, the semitransparency being obtained by very thin metal layers or by rasterization of the metal layer. "Semitransparency" refers here to translucency, i.e. the metallization normally has a light transmission of under 90%, preferably between 80% and 20%. There is further the possibility of using or combining different colored metallizations. Aluminum and/or copper are particularly suitable for metallization. The metallization directly applied to the film shows the decisive advantage of extremely high brilliance. This can be explained by the extremely smooth surface of the film, which allows particularly directional reflections in the security feature. In contrast, such metallizations on paper always appear duller, since the unevenness in the paper causes disturbances in the reflection.

These highly reflective metallizations of the film are preferably produced only partially by the so-called washing method, as described in WO 99/13157, to which reference is expressly made.

If the metallizations are additionally provided with e.g. embossed diffraction structures, this results in extremely brilliant holographic effects which cannot be produced in conventional fashion.

Such security features are particularly safe from forgery if the film is applied to the paper such that the security features come to lie on the inner side of the laminate and are thus not accessible from outside.

In a further preferred embodiment, the film is provided at least partly with a microperforation, so that the film is preferably destroyed upon mechanical tampering. The microperforation is substantially invisible in particular within the laminate. The perforation can be provided only in a partial area of the film, but also extend over the whole film surface. Any pattern can of course be produced by means of the perforation, it being preferable to use perforated lines which make the film tear particularly easily upon attempted tampering. Alternatively, information, e.g. letters or portraits, can be perforated instead of lines.

The perforations are preferably made in the film before lamination of the film onto the paper layer. This has the advantage that inclusions of air and thus folds and warps of the film are avoided during lamination. The perforation can be realized by means of heatable needle rollers, which results in holes in the order of magnitude of a few μm. Perforations of considerably smaller dimensions, namely at most 1 μm in diameter, can be obtained by laser or corona treatment. Sharp-edged embossing is also possible for producing perforations.

In a further variant, the perforations can also be made on the film already applied to the paper layer. The perforation can optionally be additionally present in the paper layer.

The form of the produced holes is arbitrary and can have for example circular or linear dimensions.

The film can be applied to the paper layer by different methods, such as extrusion of the film directly onto the paper web or lamination.

The films are preferably cold-laminated onto the paper ply. An adhesive is applied to the film, partly dried and optionally activated by temperatures of preferably at most 80 to 90° C. The film is in particular not partly melted or excessively loaded by heat. This has the advantage that stretches of the films, if any, are not destroyed but are still present after lamination.

Lamination, preferably cold lamination, ensures a firm, inseparable bond between paper and cover layer.

The laminating process is carried out via roller lamination so that very thin films with a thickness of few μm can also be laminated onto the paper layer without problems, such as bubbles or warps.

The choice of security features of the paper or the film and also the combination thereof is possible without restriction.

The paper layer and the film are inseparably interconnected preferably with an adhesive. The adhesive is preferably a water- or UV-crosslinking adhesive. It is particularly preferable to use a wet adhesive, in particular a polyurethane adhesive.

The adhesive can also be processed in very large quantities without damaging the properties of the laminate. The processing of large quantities has the advantage that security features can be incorporated into the adhesive very easily and in sufficient quantity.

The adhesive is preferably applied in quantities of from 6 to 9 g/m² and side of paper or film.

Like the paper layer and film, the adhesive can be equipped with security features. The security features expediently used here are ones that can also be incorporated within the volume of the paper or film. The security features can be feature substances with a visually and/or machine detectable physical property. The substances can have for example magnetic, electroconductive, luminescent, light-diffractive, light-polarizing, photochromic, thermochromic or light-interfering properties, and can be uniformly distributed all over or be incorporated in the form of patterns. Fluorescent substances or so-called ColorShift flakes with a thin-film structure are particularly suitable.

The adhesive layer can be varied in its optical properties depending on the application case. The adhesive can e.g. be of transparent to opaque design. Furthermore, it is possible to adapt the color of the adhesive to the application case.

The adhesive can be applied in either one layer or several layers. The film is preferably equipped with the adhesive and then the adhesive-coated film applied to the paper layer. The adhesive layers can be processed either all over or in sections as long as a firm bond in the laminate is obtained.

For example, the first adhesive layer with a first feature substance can be applied to the film all over, while a second adhesive layer with a second feature substance is applied to the first adhesive layer only in sections e.g. in the form of a coding. Likewise, the single pieces of information incorporated into different adhesive layers can complement each other to form total information.

Alternatively, different-colored adhesives can be processed, so that the adhesive layer has a rainbow pattern in a thus equipped value document. Such a rainbow pattern can be produced e.g. by gravure printing with three differently inked cylinders.

The adhesive moreover has an advantageous effect on other security elements, in particular on the optical appearance of watermarks and security threads in the paper layer. The contrast in the light/dark areas of the watermark appears much more clearly in comparison with conventional watermarks in uncoated paper. The normally used gaps in the metallic coatings of security threads can also be recognized much more easily in transmitted light.

This contrast-enhancing effect is possibly due to the fact that the adhesive penetrating into the paper layer changes the refractive index. This is merely a tentative explanation and not a scientifically confirmed fact.

Since it is possible to equip paper and/or film and/or adhesive with security features, it is also possible to combine the security features present in the individual layers such that they complement each other to form total information or else are incorporated in register. Likewise, special color effects can result, for example.

Thus, parts of a coding, such as some of the bars of a bar code, can be printed on the paper layer and the other part incorporated within the volume of the film. Likewise, writing or picture information can be divided up into single areas, the single areas being incorporated into different layers, possibly even with different security features.

In a special variant, the complementing of security features in different layers to form total information can also be used for self-authentication. In particular in the embodiments where the film and the paper layer do not completely overlap, the film and the paper layer can e.g. be provided with respective printed patterns that complement each other to form a total pattern when they overlap.

By overlapping watermarks in the paper web with colored films it is thus also possible to produce watermarks appearing colored.

Watermarks in the paper can also be combined with the above-described metallization. If watermarks with particularly bright places are used, so-called highlight watermarks, and they are overlapped e.g. with a semitransparent metal stripe located on the film, only the metal stripe can be recognized in reflection but the watermark can be recognized through the metal in transmission. These reflection/transmission effects are suitable in particular as easily recognizable human features.

The present creasable multilayer substrate avoids the disadvantages stated in the prior art. In particular, by combining paper and film the substrate unites the positive properties of both substrate types. Firstly, the mechanical strength and dimensional stability of the substrate are ensured. Shrinkage of the film is excluded with the help of the paper layer, while the paper is given additional support by the film. In particular the edge tear strength is considerably improved. Exact adaptation of paper layer, film and adhesive moreover ensures firm cohesion of the individual layers, so that splittability is considerably reduced or even impossible. On the other hand, the film prevents excessive soiling of the paper surface, thereby increasing the period of circulation. The film coating moreover leads to increased falsification security, since the security features in the paper, but also partly the security features in the film, come to lie inside the substrate and are thus no longer accessible from outside, and are optionally also disposed in a complex mutual relationship. Further, coating the paper with adhesive and film leads to an improved quality of single security features, as explained above with reference to the watermark and security thread. Despite the many advantages based on film properties, the advantages provided by paper need not be forgone. Thus, despite the film coating the properties of feel and sound normally desired in security paper remain largely unchanged.

Further advantages and embodiments will be explained in more detail with reference to the figures. It is pointed out that the figures show the layer structure of the inventive security paper only schematically. The proportions shown in the figures do not necessarily correspond to the relations existing in reality and serve primarily to improve clearness.

DETAILED DESCRIPTION OF THE INVENTION

Figure 1:
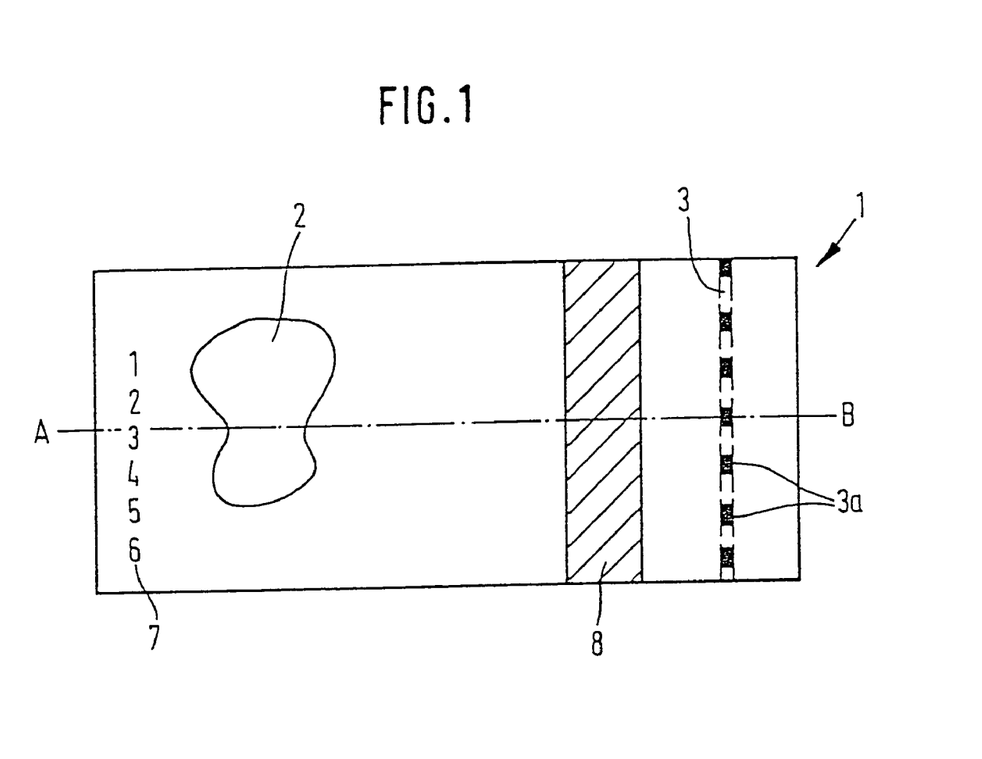
FIG. 1 shows an inventive security paper in a top view.

FIG. 1 shows an inventive value document 1, such as a bank note. The paper layer is normally produced of cotton fibers or other annual fibers. For some applications, however, it can also be expedient to replace part of these natural fibers by synthetic fibers, in particular polyamide fibers. But pure synthetic fiber papers are also conceivable. During production of the paper layer, single security elements are already embedded in the paper, such as a portrait watermark 2 and a windowed security thread 3. Said security thread 3 is virtually woven into the paper, so that it passes directly to the surface of the paper in the areas 3a while being embedded completely in the paper pulp in the areas marked by dash lines. Said thread 3 can be provided with any desired security features, such as an electroconductive, metallic layer, a hologram or the like. The paper layer is covered with film on both sides, a hologram stripe 8 being applied to one side, i.e. the interior side of the film. On the exterior side of the film a sequence of numbers normally used in bank-note printing was printed by steel intaglio printing.

Figure 2:
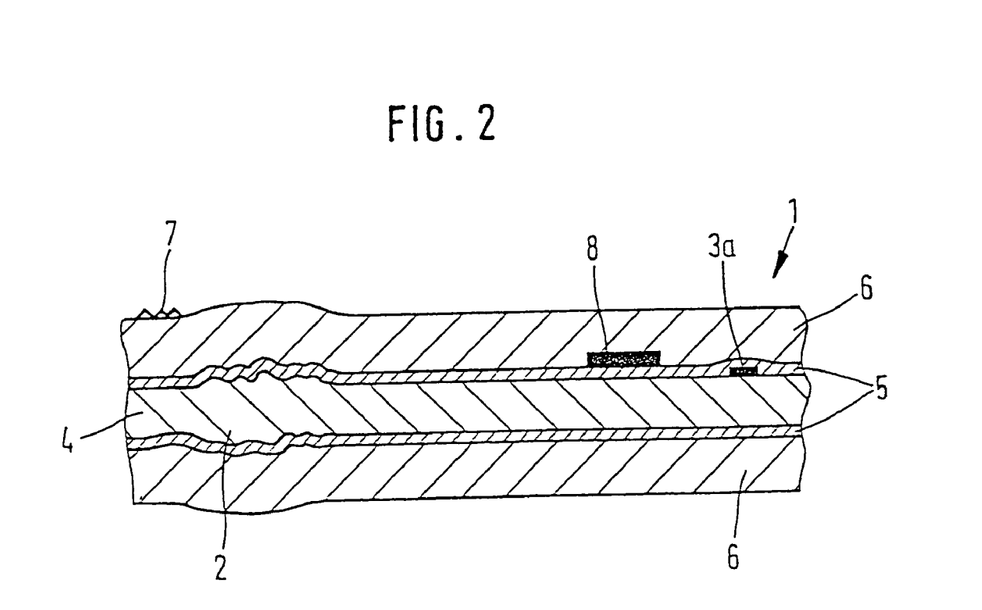
FIG. 2 shows a section along A-B through the inventive security paper according to FIG. 1.

FIG. 2 shows a section through the inventive security paper 1 along the chain-dotted line A-B in FIG. 1. The inventive security paper 1 consists of cotton paper 4 and the inventive film coating 6, which according to the shown embodiment was laminated on a surface of the security paper 1 all over by means of wet adhesive 5. Alternatively, the coating 6 can also be applied to the security paper 1 only on one side, however. The film was equipped with a hologram stripe 8 before lamination. The film was laminated on such that the stripe 8 comes to lie inside the substrate laminate. In a last step the print 7 was printed on the fully laminated substrate by intaglio printing.

Figure 3:
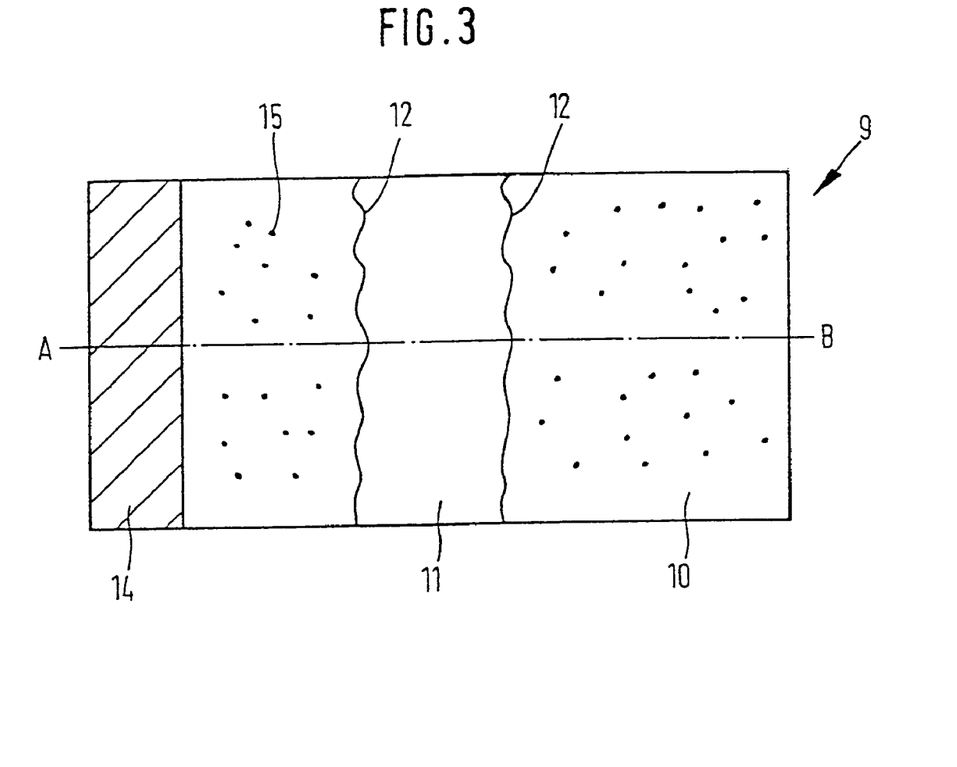
FIG. 3 shows a further embodiment of an inventive security paper in a top view.
Figure 4:
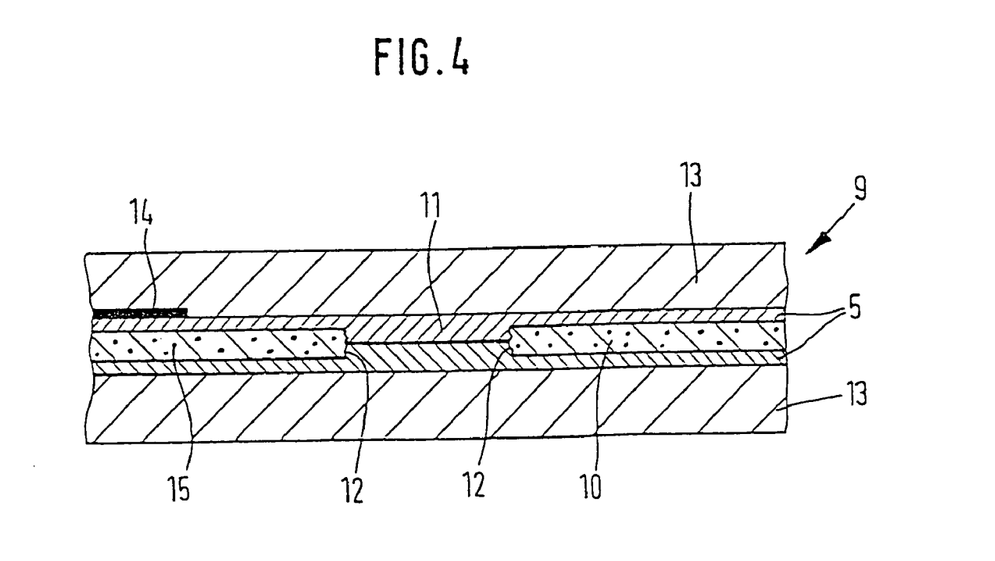
FIG. 4 shows the cross section along A-B through the inventive security paper according to FIG. 3.

FIGS. 3 and 4 show an embodiment of an inventive security paper 9. FIG. 4 shows a section through said inventive security paper 9 along the line chain-dotted A-B in FIG. 3.

As shown in FIG. 4, the security paper 9 consists of a divided paper web 10 whose edges 12 are preferably designed as deckle edges. Films 13 were applied to the paper web on both sides by means of cold-lamination and water-crosslinking adhesive 5. In the area 11 there is no paper layer but only the adhesive 5 and the films 13. A film ply is equipped on one side with a highly reflective metal stripe 14. Additionally a feature substance 15 which can be checked visually but also by machine is located within the volume of the paper. The feature substance can be for example a luminescent substance that is transparent under normal illumination and emits in the visual spectral range and thus shows an intensive hue when irradiated with UV light.

However, a plurality of feature substances that are singly detectable can also be provided. An additional coding can be produced via the mixing ratio of the feature substances.

Figure 5:
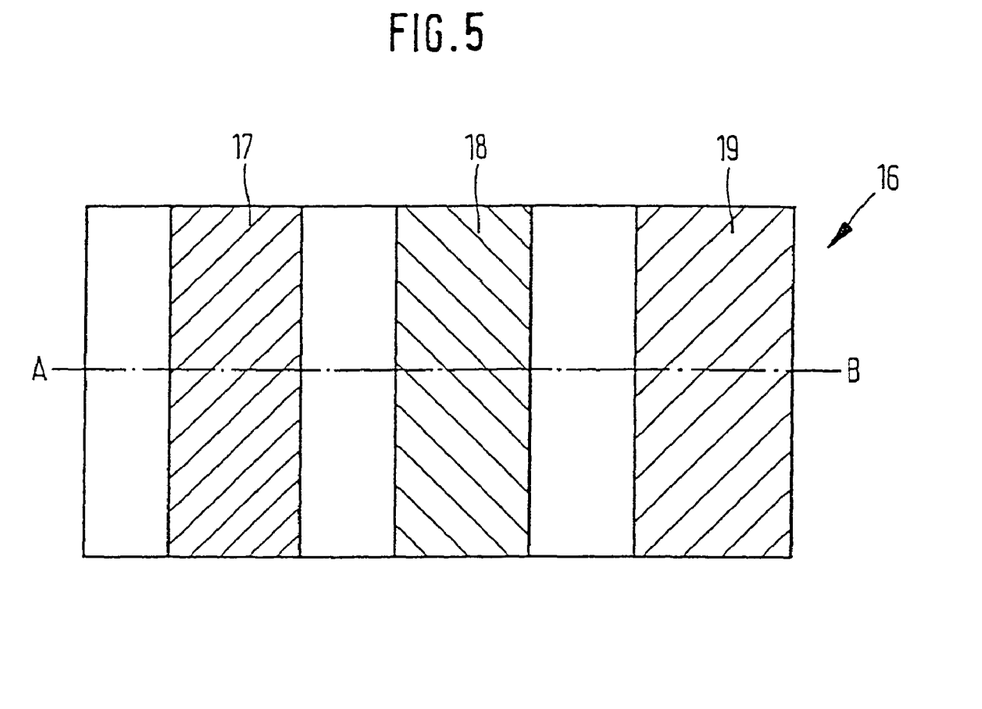
FIG. 5 shows a further embodiment of an inventive security paper in a top view.
Figure 6:
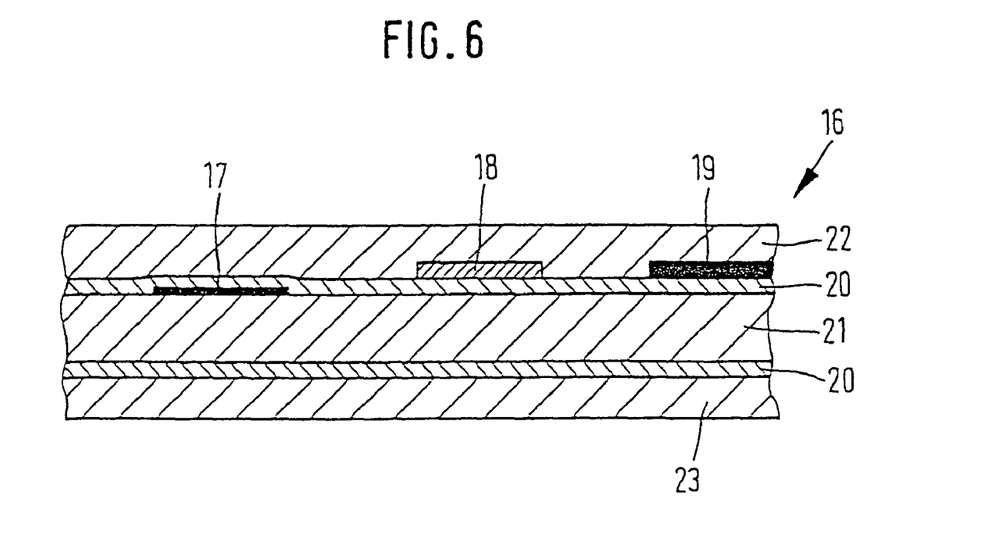
FIG. 6 shows the cross section along A-B through the inventive security paper according to FIG. 5.

FIGS. 5 and 6 show a further embodiment of an inventive security paper 16. FIG. 6 shows a section through said inventive security paper 16 along the chain-dotted line A-B in FIG. 5.

FIG. 5 shows a top view of three broad stripes 17, 18, 19 which have a different optical appearance in each case and are incorporated in different layers of the substrate.

FIG. 6 shows the cross section of the security paper 16. The paper layer 21 is printed in the form of the stripe 17 conventionally by steel intaglio printing. Thereabove a transparent adhesive layer 20 was applied. In the area 18 a second, but colored, adhesive layer was applied which yields the stripe 18. The adhesive layers 18, 20 are in turn covered with a film 22 with a hologram stripe 19 located on the inner side thereof. On the back a further film 23 was laminated on by means of the transparent adhesive 20.

Figure 7:
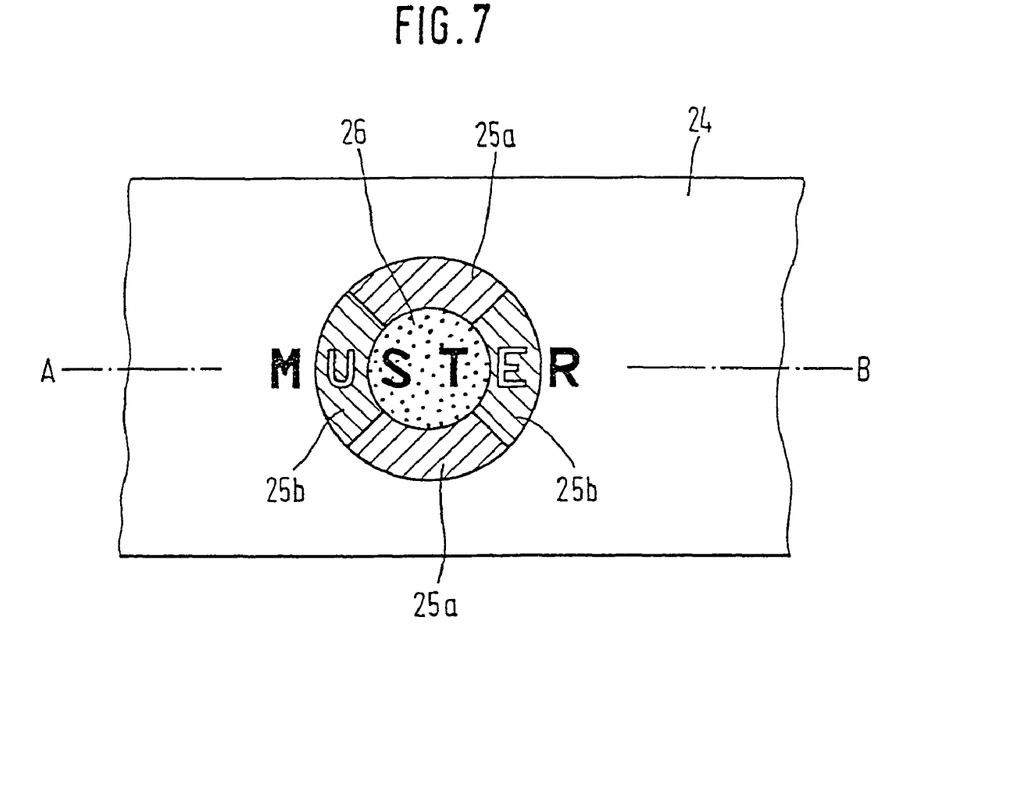
FIG. 7 shows a further embodiment of an inventive security paper in a top view.

FIG. 7 shows a detail of an inventive security paper 24 whereby different security features in different layers are disposed in register and complement each other to form the total information "MUSTER" [meaning "PATTERN"] in combination with a two-colored metallic circular ring. The circular ring is divided into four segments, the segments 25a being gold-colored and the segments 25b silver-colored. The gold and silver color is obtained for example by vapor deposition of copper and aluminum. Additionally, gaps were formed in the metal layer in the segments 25b, firstly the letter "U" and secondly the letter "E". The letters "M", "S", "T" and "R" were applied by intaglio printing, "S" and "T" being printed on the paper surface and "M" and "R" on the exterior film surface. In the area 26 there is a luminescent substance incorporated within the paper volume, which is excitable with UV light and fluorescent in visible light.

Figure 8:
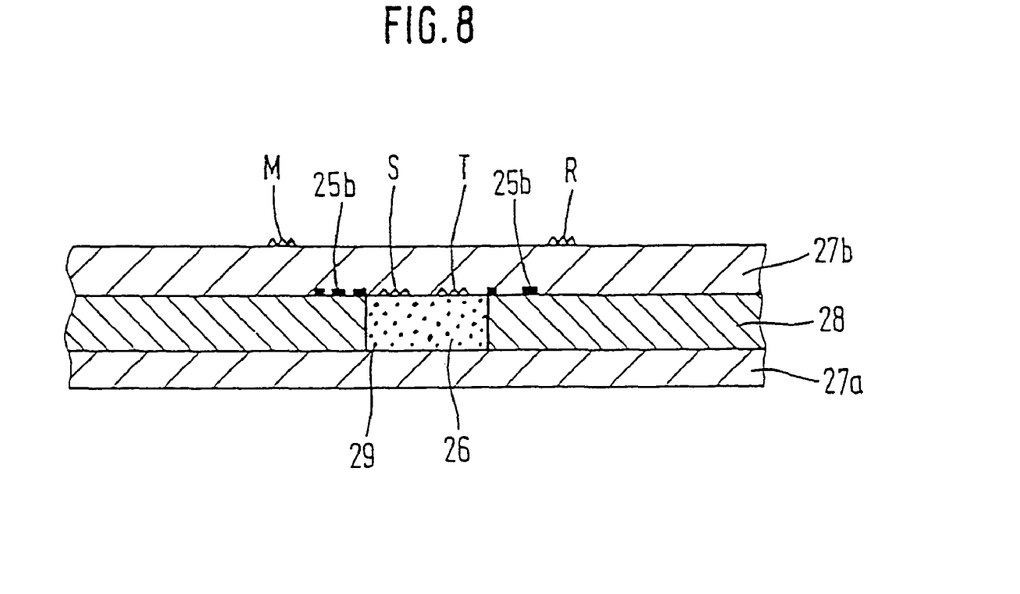
FIG. 8 shows the cross section along A-B through the inventive security paper according to FIG. 7.

FIG. 8 shows in cross section the detail of the inventive security paper 24 shown in FIG. 7. The security paper is composed of a paper layer 28 and two film layers 27a, 27b each laminated on a side of the paper layer. Luminescent substance 29 was incorporated in the paper layer 28 in the circular area 26. The letters "S" and "T" were printed on the paper layer by the intaglio printing process, said letters being located above the area 26. The film 27b is likewise equipped with security features. On the side coming to lie inside the laminate the film was designed with a gold- and silver-colored metallization, e.g. of aluminum and copper, in the form of a segmented circular ring. Gaps in the form of the letters "U" and "E" were formed in the silver-colored areas 25b. The letters "M" and "R" were printed on the exterior surfaces of the film 27b by the intaglio printing process.

Figure 9:
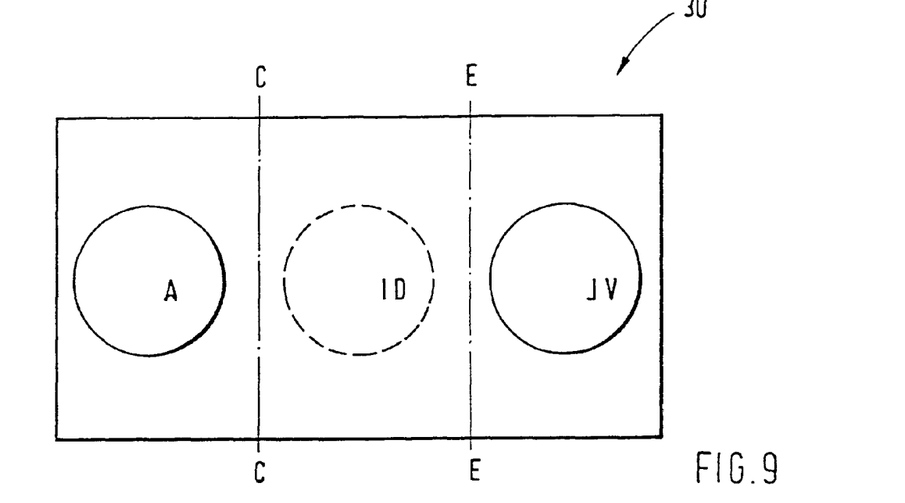
FIG. 9 shows a further embodiment of an inventive security paper in a top view.

FIG. 9 shows an inventive security paper 30 in a top view. The security paper is composed of a paper layer 31 and two film layers 32a, 32b each laminated on a side of the paper layer.

Figure 10:
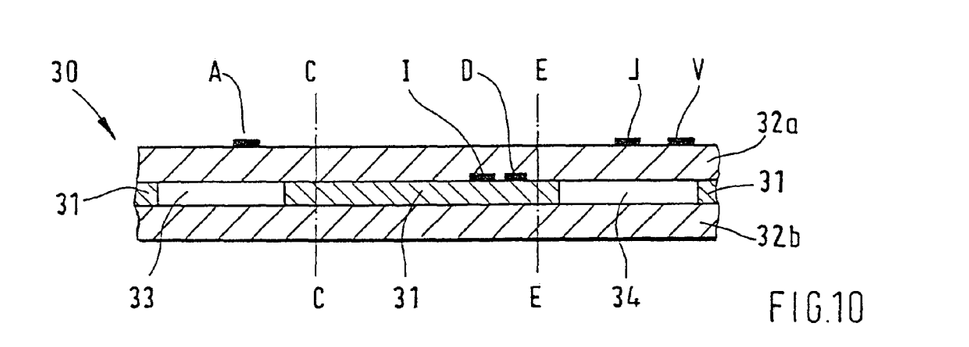
FIG. 10 shows a side view of the embodiment according to FIG. 9.

FIG. 10 shows in cross section the security paper 30 shown in FIG. 9. The films 32a and 32b are formed all over and transparent. The paper layer 31 has two gaps 33, 34 in the form of circles. Any other form can of course also be used. Furthermore, the film 32a is printed with the letters "A", "L" and "V", which appear laterally reversed in the top view according to FIG. 9. In approximately the middle of the security paper the letters "I" and "D" are printed on the paper layer 31. If the security paper is folded along the dot-dash lines C-C and E-E such that the left and right thirds of the security paper are turned upward and come to lie over each other, the printed letters complement each other to form the written image "VALID". For simplicity's sake the fields to be placed over each other are marked in FIG. 9 with circles (unbroken line or dashed line). The complementary prints can of course also be of more complex nature or produce moire effects and the like if designed accordingly.

Figure 11:
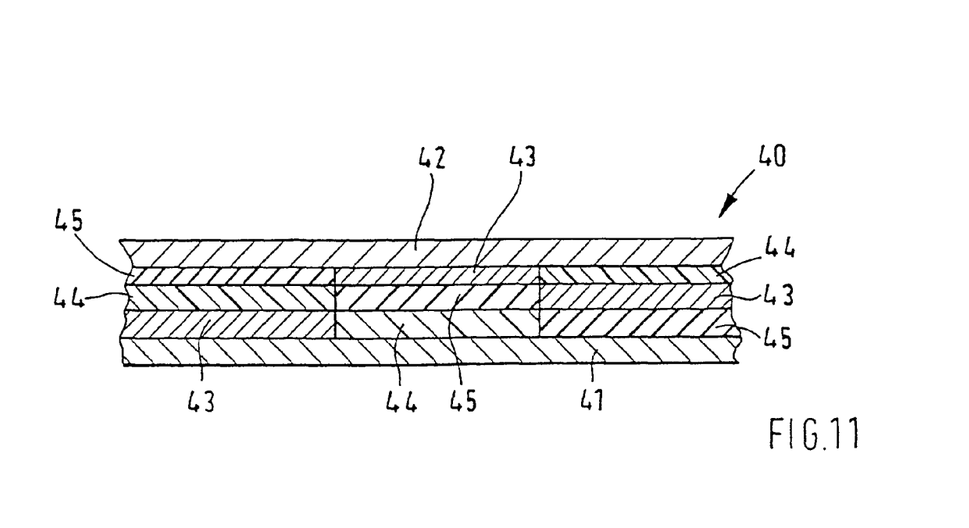
FIG. 11 shows a cross section through an inventive security paper.

FIG. 11 shows an inventive security paper 40 in cross section. The security paper consists of a paper layer 41 and a film 42 which are laminated together with three different adhesives 43, 44, 45. The adhesives can have different colors or be of different types. In the present variant, the adhesives 43, 44 45 have different adhesion properties, so that rated breaking points can be specifically incorporated into the laminate and tampering is easily recognizable due to irreversible changes. It is also conceivable to use adhesives with different refractive indexes, so that individual contours can be specifically emphasized or weakened e.g. in the area of a watermark.

The invention claimed is:

1. A security paper for producing banknotes, check forms, shares, certificates, postage stamps, air tickets or labels for product protection, including a creasable, foldable, multi-layer substrate comprising at least one paper layer laminated on both sides all over to plastic foil by way of an adhesive interconnecting the paper layer and plastic foil, wherein at least the plastic foil is equipped with at least one security feature, wherein the plastic foil has a total thickness of 1 to 20 µm on each side of the at least one paper layer and the at least one paper layer has a weight of 50 to 100 g/m$^2$.

2. The security paper according to claim 1, wherein the paper layer is interrupted.

3. The security paper according to claim 1, wherein the security feature of the plastic foil is selected from a printed image, diffraction structures, a metallization, luminescent substances, thin-film elements, liquid crystals, magnetic pigments, thermochromic substances, photochromic substances and dyes.

4. The security paper according to claim 1, wherein the security feature is a printed image executed by intaglio printing.

5. The security paper according to claim 1, wherein the plastic foils on different sides of the paper layer are under different strains.

6. The security paper according to claim 1, wherein the security paper comprises annual plant fibers.

7. The security paper according to claim 1, wherein the security paper comprises at least partly of synthetic fibers.

8. The security paper according to claim 1, wherein the paper layer is equipped at least with a security feature.

9. The security paper according to claim 1, wherein the security feature in the paper layer is a watermark.

10. The security paper according to claim 1, wherein the security feature is selected from a security thread, printed image, diffraction structures, a metallization, luminescent substances, thin-film elements, liquid crystals, magnetic pigments, thermochromic substances, photochromic substances and dyes.

11. The security paper according to claim 1, wherein security features of at least one of the paper layer, the plastic foil or further layers are applied or incorporated in register.

12. The security paper according to claim 1, wherein security features of at least one of the paper layer, the plastic foil or further layers are applied or incorporated such that they complement each other to form a combined information pattern.

13. A method for producing a creasable security paper for producing banknotes, check forms, shares, certificates, postage stamps, air tickets or labels for product protection, wherein:
   a) at least one paper layer is produced in a paper machine, and
   b) then the paper layer is laminated on both surfaces of the paper layer all over to plastic foil, the plastic foil being already equipped with at least one security feature or equipped therewith after application, the plastic foil having a total thickness of 1 to 20 μm on each side of the paper layer, wherein the plastic foil is cold-laminated on the paper layer using an adhesive between the paper layer and plastic foil.

14. The method according to claim 13, wherein the plastic foil is printed after application.

15. The method according to claim 14, wherein the printing process is intaglio printing.

16. The method according to claim 13, wherein a water-soluble laminating adhesive is used in cold lamination.

17. The security paper of claim 6 wherein said annual fibers are cotton fibers.

18. The value document of claim 1, comprising a bank note or check.

19. The security paper of claim 7, wherein the synthetic fibers are polyamide fibers.

20. The security paper according to claim 1, wherein the at least one paper layer has a weight of 80-90 g/m$^2$.

21. The method for producing a creasable security paper according to claim 13, wherein the at least one paper layer has a weight of 80-90 g/m$^2$.

22. The security paper according to claim 1, wherein the plastic foil has a total thickness on each side of the at least one paper layer of 6 to 15 μm.

23. The method according to claim 13, wherein the plastic foil has a total thickness of 6 to 15 μm.

* * * * *